United States Patent
Osogami et al.

(10) Patent No.: US 10,755,164 B2
(45) Date of Patent: *Aug. 25, 2020

(54) APPARATUS AND METHOD FOR LEARNING A MODEL CORRESPONDING TO TIME-SERIES INPUT DATA

(71) Applicant: INTERNATIONAL BUSINESS MACHINES CORPORATION, Armonk, NY (US)

(72) Inventors: Takayuki Osogami, Tokyo (JP); Makoto Otsuka, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 946 days.

This patent is subject to a terminal disclaimer.

(21) Appl. No.: 14/852,943

(22) Filed: Sep. 14, 2015

(65) Prior Publication Data

US 2016/0092767 A1 Mar. 31, 2016

(30) Foreign Application Priority Data

Sep. 30, 2014 (JP) .................. 2014-201518

(51) Int. Cl.
*G06N 3/04* (2006.01)
*G06N 3/08* (2006.01)

(52) U.S. Cl.
CPC ............. *G06N 3/0472* (2013.01); *G06N 3/08* (2013.01)

(58) Field of Classification Search
CPC .............................. G06N 3/0472; G06N 3/08
See application file for complete search history.

(56) References Cited

U.S. PATENT DOCUMENTS 4,371,895 A * 2/1983 Koga .................... H04N 19/50
375/240.14
2010/0027892 A1 2/2010 Guan et al.
(Continued)

FOREIGN PATENT DOCUMENTS

JP H0689344 A 3/1994
JP H06119454 A 4/1994
(Continued)

OTHER PUBLICATIONS

Hulten, Geoff, Laurie SPencer, and Pedro Domingos. "Mining Time-Changing Data Streams" 2001 [Online] Downloaded May 18, 2018 http://delivery.acm.org/10.1145/510000/502529/p97-hulten. pdf?ip=151.207.250.51&id=502529&acc=ACTIVE%20SERVICE &key=C15944E53D0ACA63%2E4D4702B0C3E38B35% 2E4D4702B0C3E38B35%2E4D4702B0C3E38B35&_acm_= 1526590285_d8a6c52e1d554ae96815.*

(Continued)

*Primary Examiner* — Ben M Rifkin
(74) *Attorney, Agent, or Firm* — Cantor Colburn LLP; Vazken Alexanian

(57) ABSTRACT

A dynamic time-evolution Boltzmann machine capable of learning is provided. Aspects include acquiring a time-series input data and supplying a plurality of input values of input data of the time-series input data at one time point to a plurality of nodes of the mode. Aspects also include computing, based on an input data sequence before the one time point in the time-series input data and a weight parameter between each of a plurality of input values of input data of the input data sequence and a corresponding one of the plurality of nodes of the model, a conditional probability of the input value at the one time point given that the input data sequence has occurred. Aspects further include adjusting the weight parameter so as to increase a conditional probability (Continued)

of occurrence of the input data at the one time point given that the input data sequence has occurred.

6 Claims, 9 Drawing Sheets

(56) References Cited

U.S. PATENT DOCUMENTS

2010/0100511 A1    4/2010   Hirose et al.
2015/0319444 A1    11/2015   Ando

FOREIGN PATENT DOCUMENTS

| JP | H06162234 A | 6/1994 |
| JP | H07248841 | 9/1995 |

OTHER PUBLICATIONS

Klinkenberg, Ralf. "Learning drifting Concepts: Example selection vs. Example weighting" 2004 [Online] Downloaded May 18, 2018 http://eds.b.ebscohost.com/ehost/pdfyiewer/pdfyiewer?vid=1&sid=50a9328d-f89e-4abf-a4a6-f54e11f79c22%40sessionmgr101.*

Taylor, Graham W. and Geoffrey E. Hinton. "Factored Conditional Restricted Boltzmann Machines for Modeling Motion style" 2009 [Online] Downloaded Nov. 26, 2019 https://dl.acm.org/citation.cfm?id=1553505 (Year: 2009).*

Sivashankar, M and Harsha Venkatesh. "High-Density Programmable FIFO Memoryy for Use in Video and Imaging Applications" 2011 [Online] Downloaded Nov. 26, 2019 https://www.cypress.con/file/107671/download (Year: 2011).*

List of IBM Patents or Patent Applictions Treated as Related; (Appendix P), Filed Jan. 29, 2016, 2 pages.

Takayuki Osogami, et al., Pending U.S. Appl. No. 14/967,637 entitled "Apparatus and Method for Learning a Model Corresponding to Time-Series Input Data," filed with the USPTO on Dec. 14, 2015.

Hinton et al., "Spiking Boltzmann Machines", Advances in Neural Information Processing Systems 12 (NIPS 1999); pp. 122-123.

Sutskever et al. "Learning Multilevel Distributed Representations for High-Dimensional Sequences" in International Conference on Artificial Intelligence and Statistics, (2007) pp. 548-555.

Sutskever et al. "The Recurrent Temporal Restricted Boltzmann Machine" Advances in Neural Information Processing Sytems, (2008); pp. 1601-1608.

\* cited by examiner

APPARATUS AND METHOD FOR LEARNING A MODEL CORRESPONDING TO TIME-SERIES INPUT DATA

FOREIGN PRIORITY

This application claims priority to Japanese Patent Application No. JP 2014-201518, filed Sep. 30, 2014, and all the benefits accruing therefrom under 35 U.S.C. § 119, the contents of which in its entirety are herein incorporated by reference.

BACKGROUND

The present invention relates generally to computer based learning, and more specifically to, methods and system for learning a model corresponding to time-series input data a program product.

It has been known that machine learning using Boltzmann machines can achieve high performance in classification of still images or the like. Such Boltzmann machines applied to time-series data, namely, dynamic Boltzmann machines, have been proposed. However, learning is a challenge in Boltzmann machines that consider such time evolution, and this challenge hinders Boltzmann machines from being applied to time-series prediction or the like.

SUMMARY

A first aspect of the present invention provides a learning apparatus for learning a model corresponding to time-series input data, including an acquiring unit that acquires the time-series input data; a supplying unit that supplies a plurality of input values of input data of the time-series input data at one time point to a plurality of nodes of the model; a computing unit that computes, on the basis of an input data sequence before the one time point in the time-series input data and a weight parameter between each of a plurality of input values of input data of the input data sequence and a corresponding one of the plurality of nodes of the model, a conditional probability of the input value at the one time point given that the input data sequence has occurred; and a learning processing unit that adjusts the weight parameter so as to increase a conditional probability of occurrence of the input data at the one time point given that the input data sequence has occurred. The first aspect of the present invention also provides a learning method and a program product.

A second aspect of the present invention provides a processing apparatus that predicts next input data from time-series input data by using a model corresponding to the time-series input data, including an acquiring unit that acquires the time-series input data; a supplying unit that supplies a plurality of input values corresponding to a prediction target time point to a plurality of nodes of the model; a node computing unit that computes, on the basis of an input data sequence before the prediction target time point in the time-series input data and a weight parameter between each of a plurality of input values of input data in the input data sequence and a corresponding one of the plurality of nodes of the model, a conditional probability of the input value corresponding to the prediction target time point given that the input data sequence has occurred; and a data computing unit that computes, on the basis of the conditional probabilities of the input values corresponding to the prediction target time point, a conditional probability of next input data being a predetermined value given that the time-series input data has occurred. The second aspect of the present invention also provides a processing method and a program product.

A third aspect of the present invention provides a prediction system including the learning apparatus according to the first aspect and the processing apparatus according to the second aspect.

Note that the summary of the invention does not include all the necessary features of the present invention, and sub-combinations of these features are also encompassed by the present invention.

DETAILED DESCRIPTION

The present invention will be described below through an embodiment of the invention. The following embodiment however does not limit the present invention described by claims. In addition, all combinations of features described in the embodiment are not necessarily mandatory for the solutions provided by the present invention.

Figure 1:
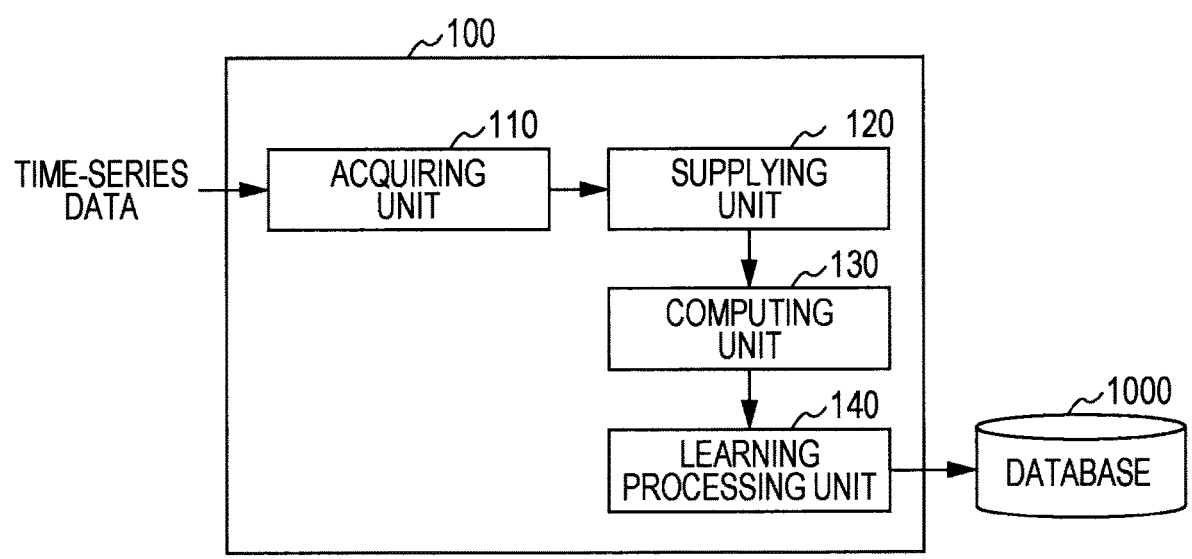
FIG. 1 illustrates an exemplary configuration of a learning apparatus according to an embodiment.

FIG. 1 illustrates an exemplary configuration of a learning apparatus 100 according to an embodiment. The learning apparatus 100 is an apparatus for learning a model corresponding to time-series input data. The learning apparatus 100 learns a model based on a Boltzmann machine by supplying time-series data to nodes of the model. The learning apparatus 100 includes an acquiring unit 110, a supplying unit 120, a computing unit 130, and a learning processing unit 140.

The acquiring unit 110 acquires time-series input data. Time-series input data may be, for example, a data sequence in which a plurality of data items are arranged along a time axis, such as moving image data. The acquiring unit 110 may be connected to a device operated by a user or a device (sensor) that detects and outputs time-series data and may acquire the time-series input data from such a device. Alternatively, the acquiring unit 110 may read and acquire time-series input data stored in a storage device in a predetermined format. Alternatively, the acquiring unit 110 may be connected to a network and acquire time-series input data via the network. The acquiring unit 110 may also store the acquired time-series input data in a storage device included in the learning apparatus 100.

The supplying unit 120 supplies a plurality of input values of input data of the time-series input data at one time point to a plurality of nodes of a model. The supplying unit 120 is connected to the acquiring unit 110. The supplying unit 120 handles, as training data, input data of the received time-series input data at one time point and supplies input values at the one time point to corresponding nodes of the model. Input data at one time point may be the latest data in a training data set for use in learning. Alternatively, input data at one time point may be temporary middle data in a training data set for use in learning. That is, input data at one time point may be selected from time-series data in any given manner.

The computing unit 130 computes a conditional probability of each input value at one time point given that an input data sequence has occurred. A model used by the learning apparatus 100 has a weight parameter between each of a plurality of input values of input data in an input data sequence and a corresponding one of the plurality of nodes. The computing unit 130 computes a conditional probability of each input value at one time point on the basis of an input data sequence before the one time point in the time-series input data and the weight parameter of the model.

The learning processing unit 140 is connected to the computing unit 130 and increases a conditional probability of input data at one time point occurring given that the input data sequence has occurred by adjusting the weight parameter of the model. The learning processing unit 140 further adjusts bias parameters which are given to the plurality of nodes of the model. The learning processing unit 140 supplies the adjusted weight parameter and bias parameters of the model to a storage device, such as an external database 1000, so as to store these parameters in the storage device.

The above-described learning apparatus 100 according to the embodiment learns the model by adjusting the weight parameter and bias parameters of the model in accordance with input data of time-series input data at one time point. The model according to the embodiment will be described with reference to FIG. 2.

Figure 2:
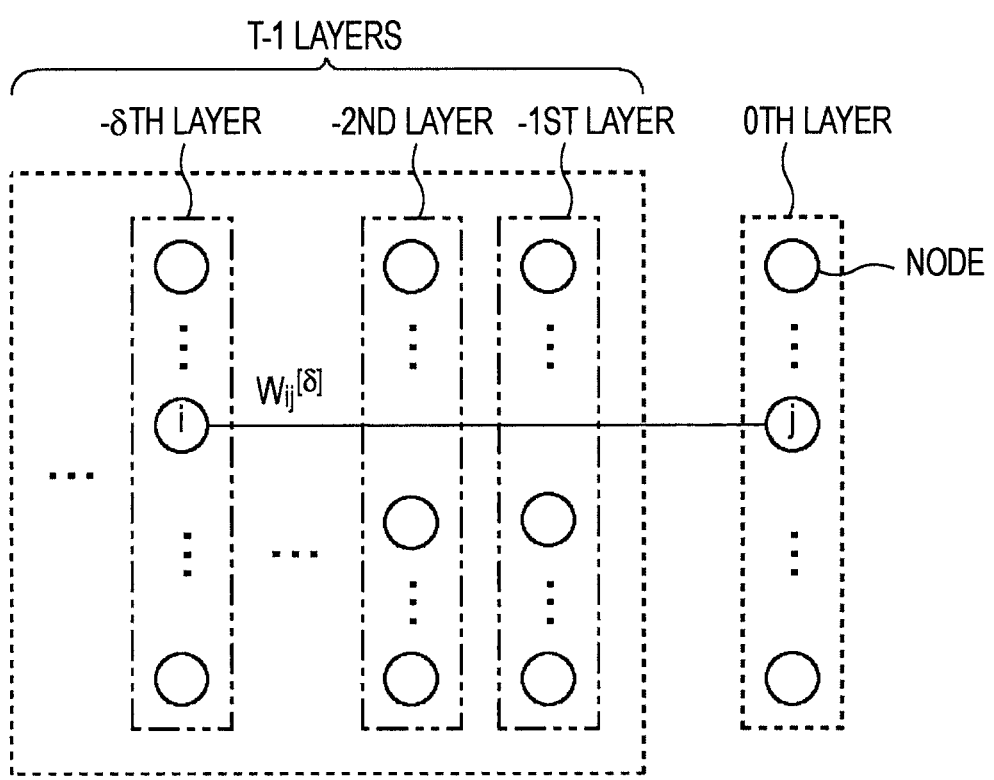
FIG. 2 illustrates an exemplary configuration of a model according to an embodiment.

FIG. 2 illustrates an example of a configuration of a model 10 according to the embodiment. The model 10 includes a plurality of layers. FIG. 2 illustrates an example of the model 10 including a total of T layers. The model 10 may include a finite or infinite number of layers. The 0th layer is a layer for input data of time-series data at one time point. In the embodiment, an example is described in which each layer has the same number of nodes as the number of input values contained in the input data. Note that each layer may have more nodes than the number of input values, and nodes that are not associated with the input values may be used in an auxiliary manner.

A total of T−1 layers other than the 0th layer among a plurality of layers are layers for an input data sequence before the one time point. For example, the −1st layer is associated with input data at a time point that precedes the one time point by one time point, whereas the −δth layer is associated with input data at a time point that precedes the one time point by δ time points. That is, a total of T−1 layers other than the 0th layer each have the same number of nodes as the 0th layer and are each supplied with input values of corresponding input data in the input data sequence, for example.

For example, in the case where time-series input data is moving image data, the 0th layer is associated with the last image data of the moving image data, and a plurality of nodes of the 0th layer each receive corresponding pixel data of the image data. In addition, the −1st layer is supplied with image data that immediately precedes the last image data, and a plurality of nodes of the −1st layer each receive corresponding pixel data of the immediately preceding image data. Similarly, a plurality of nodes of the −δth layer each receive corresponding pixel data of image data that precedes the last image data by δ images.

The plurality of nodes of the 0th layer have bias parameters. For example, the jth node j has a bias parameter bj. In addition, the plurality of nodes in each layer do not have a weight parameter applied therebetween. A plurality of nodes of the 0th layer and corresponding nodes of a layer associated with an input data sequence before the one time point have a weight parameter applied therebetween. FIG. 2 illustrates a concept of a weight parameter Wij[δ] between the node j of the 0th layer and a node i of the −δth layer.

Specifically, the weight parameter Wij[δ] is denoted by the following equation.

$$W_{ij}^{[\delta]} = \hat{W}_{ij}^{[\delta]} + W_{ji}^{[-\delta]} \qquad \text{Eq. 1}$$

$$\hat{W}_{ij}^{[\delta]} = \begin{cases} 0 & \text{if } \delta = 0 \\ \sum_{k \in K} u_{i,j,k} \lambda_k^{\delta - d_{ij}} & \text{if } \delta \geq d_{ij} \\ \sum_{l \in L} -v_{i,j,l} \mu_l^{-\delta} & \text{otherwise} \end{cases}$$

Here, ui, j, k and vi, j, l are learning parameters to be learned, and λkt1 and μlt2 are predefined parameters that change in a predetermined manner in accordance with a time difference δ between the input data in the input data sequence and input data at the one time point (t1=δ−dij, t2=−δ). That is, the weight parameter Wij[δ] is a parameter based on the learning parameters ui, j, k and vi, j, l and the predefined parameters λkt1 and μlt2.

The weight parameter Wij[δ] is a parameter based on a positive value, which is based on a product of a first learning parameter ui, j, k and a first predefined parameter λkt1, and a negative value, which is based on a product of a second learning parameter vi, j, l and a second predefined parameter μlt2. Specifically, in the case where the time difference δ is greater than or equal to a predetermined delay constant dij, the weight parameter Wij[δ] takes a positive value based on a product of the first learning parameter ui, j, k and the first predefined parameter λkt1. In the case where the time difference δ is less than the delay constant dij and is not equal to 0, the weight parameter Wij[δ] takes a negative value based on a product of the second learning parameter vi, j, l and the second predefined parameter μlt2. In addition, in the case where the time difference δ is equal to 0, the weight parameter Wij[δ] is equal to 0.

In addition, in the case where the time difference δ is greater than or equal to the predetermined delay constant dij, the weight parameter Wij[δ] is based on a plurality of positive values that are based on products ui, j, k·λkt1 of a plurality of sets of the first learning parameter ui, j, k and the first predefined parameter λkt1 respectively from among the plurality of first learning parameters ui, j, k and the plurality of first predefined parameters λkt1. In addition, in the case where the time difference δ is less than the predetermined delay constant dij and is not equal to 0, the weight parameter Wij[δ] is based on a plurality of negative values that are based on products vi, j, l·μlt2 of a plurality of sets of the second learning parameter vi, j, l and the second predefined parameter μlt2 respectively from among the plurality of second learning parameters vi, j, l and the plurality of second predefined parameters μlt2.

A predefined parameter is a parameter based on a value obtained by raising a predetermined constant to the power of a value based on the time difference δ. The first predefined parameter λkt1 is a parameter whose value gradually decreases as the time difference δ increases, for example. In this case, the first predefined parameter λkt1 takes a value obtained by raising a first constant λk (which is greater than 0 and less than 1) to the power of a value obtained by subtracting the predetermined delay constant dij from the time difference δ (δ−dij=t1). In addition, the second predefined parameter μlt2 is a parameter whose value gradually decreases as the time difference δ increases, for example. In this case, the second predefined parameter μlt2 takes a value obtained by raising a second constant μ (which is greater than 0 and less than 1) to the power of a negative value of the time difference δ (−δ=t2).

The above-described model 10 according to the embodiment forms a Boltzmann machine. That is, the model 10 is a Boltzmann machine to which time-series data is applied. The learning apparatus 100 according to the embodiment learns the model 10 by adjusting the learning parameters ui, j, k and vi, j, l and the bias parameter bj using, as training data, input data at one time point that is supplied to the 0th layer of the model 10. A learning operation of the learning apparatus 100 will be described with reference to FIG. 3.

Figure 3:
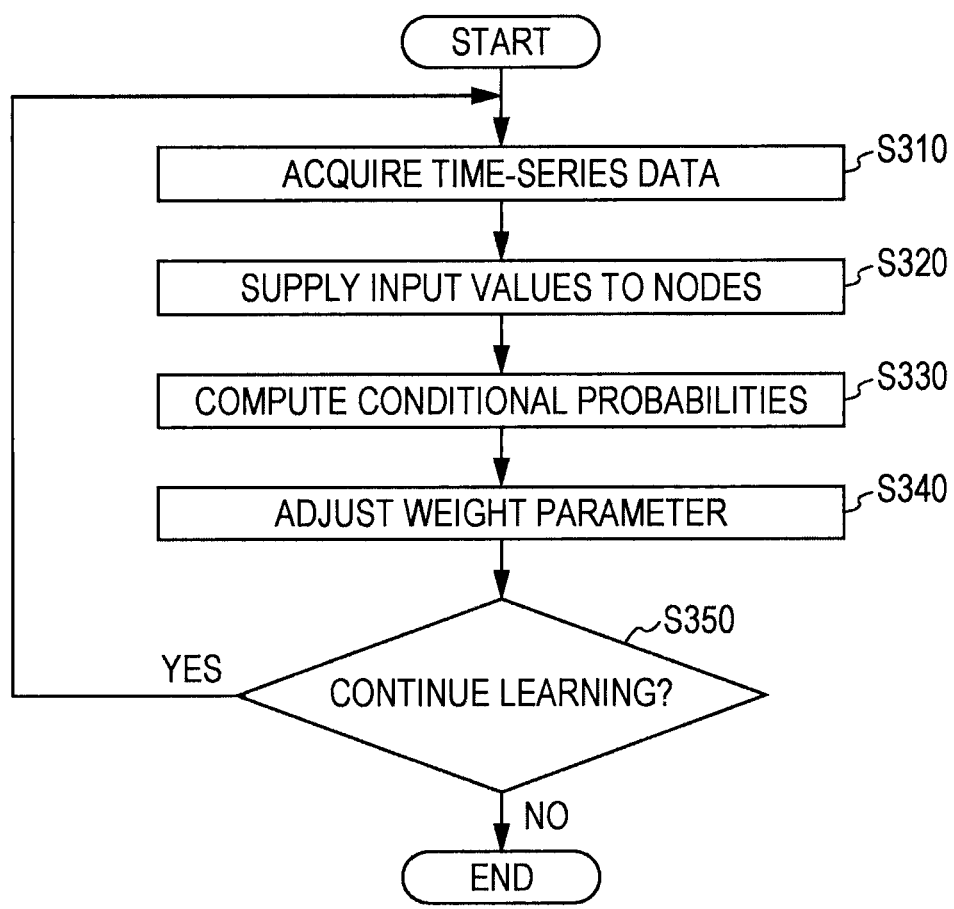
FIG. 3 illustrates a flow of an operation of the learning apparatus according to an embodiment.

FIG. 3 illustrates a flow of an operation of the learning apparatus 100 according to the embodiment. In the embodiment, the learning apparatus 100 executes processing steps of S310 to S350 so as to learn the model 10 corresponding to time-series input data and decides upon the learning parameters ui, j, k and vi, j, l and the bias parameter bj.

First, the acquiring unit 110 acquires time-series data (S310). The acquiring unit 110 may acquire time-series data of a duration equivalent to a total of T layers from the 0th layer to the (−T+1)th layer of the model 10. The acquiring unit 110 acquires, for example, T time-series image data items of moving image data.

Then, the supplying unit 120 supplies a plurality of input values of input data of the time-series input data at one time point to the plurality of nodes of the 0th layer of the model 10 (S320). Here, let x[0] denote input data supplied to the 0th layer. The supplying unit 120 supplies, for example, a plurality of input values xj[0] of input data x[0] of the time-series input data at the latest time point to the corresponding nodes j of the 0th layer. For example, the supplying unit 120 supplies a plurality of pixel data items included in the last image data item of T time-series image data items of moving image data to a plurality of nodes of the 0th layer. If the duration of the time-series input data is shorter than T, the supplying unit 120 supplies the time-series input data to the corresponding number of layers from the 0th layer and supplies, for example, a value of 0 to nodes of the rest of the layers.

Then, the computing unit 130 supplies a plurality of input values of an input data sequence before the one time point to the plurality of nodes included in respective layers from the −1st layer to the (−T+1)th layer of the model 10. Here, let x(−T, −1] denote input data supplied to layers from the −1st layer to the (−T+1)th layer, where (−T, −1] indicates layers from the (−T+1)th layer to the −1st layer. That is, the input data x(−T, −1] in the time-series data denotes a history up to the input data x[0].

For example, the computing unit 130 supplies a plurality of input values of input data of the time-series input data at the 8th latest time point, to the plurality of nodes of the −δth layer. For example, among T time-series image data items of moving image data, the computing unit 130 supplies a plurality of pixel data times of the 1st to the (T−1)th image data items to the plurality of nodes of the (−T+1)th layer to the −1st layer, respectively.

Then, the computing unit 130 computes conditional probabilities of the input value at the one time point on the basis of the plurality of input values of the input data sequence supplied to the plurality of nodes of the (−T+1)th layer to the −1st layers and the weight parameter Wi,j[δ] (S330). Specifically, the computing unit 130 computes a probability <xj[0]>θ of the input value xj[0] of the jth node of the 0th layer being equal to 1 by substituting 1 for xj[0] of the following equation on the basis of the input data history x(−T, −1]. Note that the example in which the input value xj[0] of each node is binary, that is, 1 or 0, is described in the embodiment; however, the value of the input value xj[0] is not limited to these values.

$$\langle X_j^{[0]} \rangle_\theta = p_{\theta,j}(x_j^{[0]} \mid x^{(-T,-1]}) = \frac{\exp(-\tau^{-1} E_{\theta,j}(x_j^{[0]} \mid x^{(-T,-1]}))}{1 + \exp(-\tau^{-1} E_{\theta,j}(x_j^{[0]} \mid x^{(-T,-1]}))} \quad \text{[Eq. 2]}$$

(Eq. 2) is derived as a Boltzmann machine from a known probability formula. Here, θ denotes a set of parameters to be computed, and θ=(bj, ui, j, k, vi, j, l). In addition, τ is a parameter that is dependent on a known "temperature of the system" of the Boltzmann machine and that is preset by a user or the like. Also, Eθ,j(xj[0]|xj(−T,−1]) of (Eq. 2) is computed by using the following equation.

$$E_{\theta,j}(x_j^{[0]} \mid x^{(-T,-1]}) = -b_j x_j^{[0]} - \sum_{t=-T}^{-1} (x^{[t]})^T W_{:,j}^{[-t]} x_j^{[0]} \quad \text{Eq. 3}$$

Here, "T" denotes a transpose, ":" denotes 1 to n when n denotes the number of nodes, and ":,j" indicates extraction of the jth column. That is, the second term of the right side of (Eq. 3) is denoted by the following equation.

$$\sum_{t=-T}^{-1} (x^{[t]})^T W_{:,j}^{[-t]} x_j^{[0]} = (x_1^{[t]}, x_2^{[t]}, \ldots, x_n^{[t]}) \begin{pmatrix} W_{1,j}^{[-t]} \\ W_{2,j}^{[-t]} \\ \vdots \\ W_{n,j}^{[-t]} \end{pmatrix} x_j^{[0]}$$

$$= \sum_{i=1}^{N} \left( \sum_{k \in K} u_{i,j,k} \alpha_{i,j,k} - \sum_{l \in L} v_{i,j,l} \beta_{i,j,l} - \sum_{l \in L} v_{j,i,l} \gamma_{i,l} \right) x_j^{[0]} \quad \text{Eq. 4}$$

Here, αi, j, k, βi, j, l, and γi,l are denoted by the following equations.

$$\alpha_{i,j,k} \equiv \sum_{t=-T}^{-d_{i,j}} \lambda_k^{-t-d_{i,j}} x_i^{[t]} \quad \text{Eq. 5}$$

$$\beta_{i,j,l} \equiv \sum_{t=-d_{i,j}+1}^{-1} \mu_l^t x_i^{[t]} \quad \text{Eq. 6}$$

$$\gamma_{i,l} \equiv \sum_{t=-T}^{-1} \mu_l^{-t} x_i^{[t]} \quad \text{Eq. 7}$$

Accordingly, Pθ,j(1|xj(−T,−1]) obtained by substituting 1 for xj[0] of (Eq. 2) can be computed from (Eq. 3) by substituting 1 for xj[0] of (Eq. 5). Note that predetermined initial values (for example, 0) may be substituted for the parameter set θ=(bj, ui, j, k, vi, j, l). In this way, the computing unit 130 can compute a conditional probability <xj[0]>θ of the input value xj[0] at the one time point which is denoted by (Eq. 2).

Then, the learning processing unit 140 adjusts the parameter set θ=(bj, ui, j, k, vi, j, l) (S340). When adjusting the bias parameter bj, the learning processing unit 140 determines a direction of the change in the bias parameter bj by using the following equation.

$$\frac{\partial}{\partial b_j} \log P_\theta(x^{[0]} \mid x^{(-T,-1]}) = \tau^{-1}(x_j^{[0]} - \langle x_j^{[0]} \rangle_\theta) \quad \text{Eq. 8}$$

Here, xj[0] on the right side of (Eq. 8) denotes an input value supplied as training data by the supplying unit 120, and <xj[0]>θ on the right side denotes a probability computed by using (Eq. 2). The bias parameter bj is adjusted and updated as denoted by the following equation by using (Eq. 8). Note that a coefficient c is a parameter predetermined by the user or the like.

$$b_j \leftarrow b_j + c\frac{1}{\tau}(x_j^{[0]} - \langle X_j^{[0]} \rangle_\theta) \quad \text{Eq. 9}$$

That is, the learning processing unit 140 adjusts the bias parameter bj so as to increase the conditional probability of the input value xj[0] at the node of the 0th layer given that the input data sequence denoted by the history x(−T, −1] has occurred. The learning processing unit 140 iteratively performs updating of the bias parameter bj denoted by (Eq. 9) and computing of the probability <xj[0]>θ denoted by (Eq. 2), and decides upon the bias parameter bj. The learning processing unit 140 stops updating the bias parameter bj in the case where a difference in the bias parameter bj before and after updating is less than or equal to a predetermined threshold and decides upon the bias parameter bj.

Alternatively, the learning processing unit 140 may decide upon the bias parameter bj by iteratively updating the bias parameter bj a predetermined number of times. In the case where a difference in the bias parameter bj before and after updating is greater than or equal to the predetermined threshold even after the bias parameter bj has been updated the predetermined number of times, the learning processing unit 140 may stop updating the bias parameter bj and inform the user that the parameter does not converge.

Similarly, when updating the learning parameter ui, j, k, the learning processing unit 140 determines the direction of a change in the learning parameter ui, j, k by using the following equation.

$$\frac{\partial}{\partial u_{i,j,k}} \log P_\theta(x^{[0]} \mid x^{(-T,-1]}) = \tau^{-1}\alpha_{i,j,k}(x_j^{[0]} - \langle X_j^{[0]} \rangle_\theta) \quad \text{Eq. 10}$$

In addition, when updating the learning parameter vi, j, l, the learning processing unit 140 determines the direction of a change in the learning parameter vi, j, l by using the following equation.

$$\frac{\partial}{\partial v_{i,j,l}} \log P_\theta(x^{[0]} \mid x^{(-T,-1]}) = \quad \text{Eq. 11}$$
$$-\tau^{-1}\beta_{i,j,l}(x_j^{[0]} - \langle X_j^{[0]} \rangle_\theta) - \tau^{-1}\gamma_{j,l}(x_i^{[0]} - \langle X_i^{[0]} \rangle_\theta)$$

Just like updating of the bias parameter bj, the learning processing unit 140 may iteratively perform updating of the learning parameters ui, j, k and vi, j, l and computing of the probability <xj[0]>θ and decide upon the learning parameters ui, j, k and vi, j, l. Alternatively, the learning processing unit 140 may iteratively perform an operation for updating the parameter set θ=(bj, ui, j, k, vi, j, l) and then computing the probability <xj[0]>θ denoted by (Eq. 2) and decide upon the parameter set θ=(bj, ui, j, k, vi, j, l).

As described above, the learning processing unit 140 according to the embodiment can decide upon the learning parameters ui, j, k and vi, j, l and the bias parameter bj through learning. The learning apparatus 100 then determines whether to continue learning (S350). The learning apparatus 100 may continue learning until it performs the learning process a predetermined number of times, or may continue learning until a stop command is input by the user. Alternatively, the learning apparatus 100 may continue learning until it can no longer acquire time-series data.

If the learning apparatus 100 continues learning (S350: YES), the process returns to step S310, in which the acquiring unit 110 acquires the next time-series data. The learning apparatus 100 then performs learning of the model based on the next time-series data. For example, the acquiring unit 110 acquires the next image data of the image data and supplies the next image data to the 0th layer. At this time, values held in the t-th (−T<t<0) are supplied to the (t−1)th layer. In the case where T represents a finite number, values held in the (−T+1)th layer are deleted. The learning apparatus 100 performs learning by using image data supplied to the 0th layer to the (−T+1)th layer as training data.

As described above, the acquiring unit 110 sequentially acquires new input data from time-series input data, and the supplying unit 120 sequentially supplies a plurality of input values xj[0] of the new input data to the plurality of nodes. Then, the computing unit 130 computes a conditional probability <xj[0]>8 of the input value xj[0] at a time point corresponding to the new input data given that a input data sequence x(−T, −1] preceding the new input data in the time-series data has occurred. The learning processing unit 140 adjusts the weight parameter so as to increase the conditional probability of the new input data occurring given that the input data sequence x(−T, −1] has occurred.

If the learning processing unit 140 ends learning (S350: NO), the learning processing unit 140 outputs the learning parameters ui, j, k and vi, j, l and the bias parameter bj that have been decided so as to store the parameters in the external database 1000 or the like.

As described above, the learning apparatus 100 according to the embodiment applies, to time-series input data that is input in time series, a model having a total of T layers by associating one time point with the 0th layer and an input data sequence before the one time point with T−1 layers, thereby configuring a time-evolution Boltzmann machine that predicts input data at one time point on the basis of the input data sequence. The learning apparatus 100 computes a conditional probability of the input data at the one time point on the basis of the input data sequence x(−T,−1] (i.e., a history) for a time evolution model, thereby being able to learn the model.

The description has been given of the learning apparatus 100 according to the embodiment that sequentially acquires new input data from time-series input data and adjusts the weight parameter for each input data acquired. Instead of this configuration, the learning apparatus 100 may acquire time-series input data of a predetermined duration and then adjust the weight parameter. For example, the learning processing unit 140 adjusts the weight parameter collectively for a plurality of time points in response to acquisition of new input data at the plurality of time points corresponding to D layers.

Figure 4:
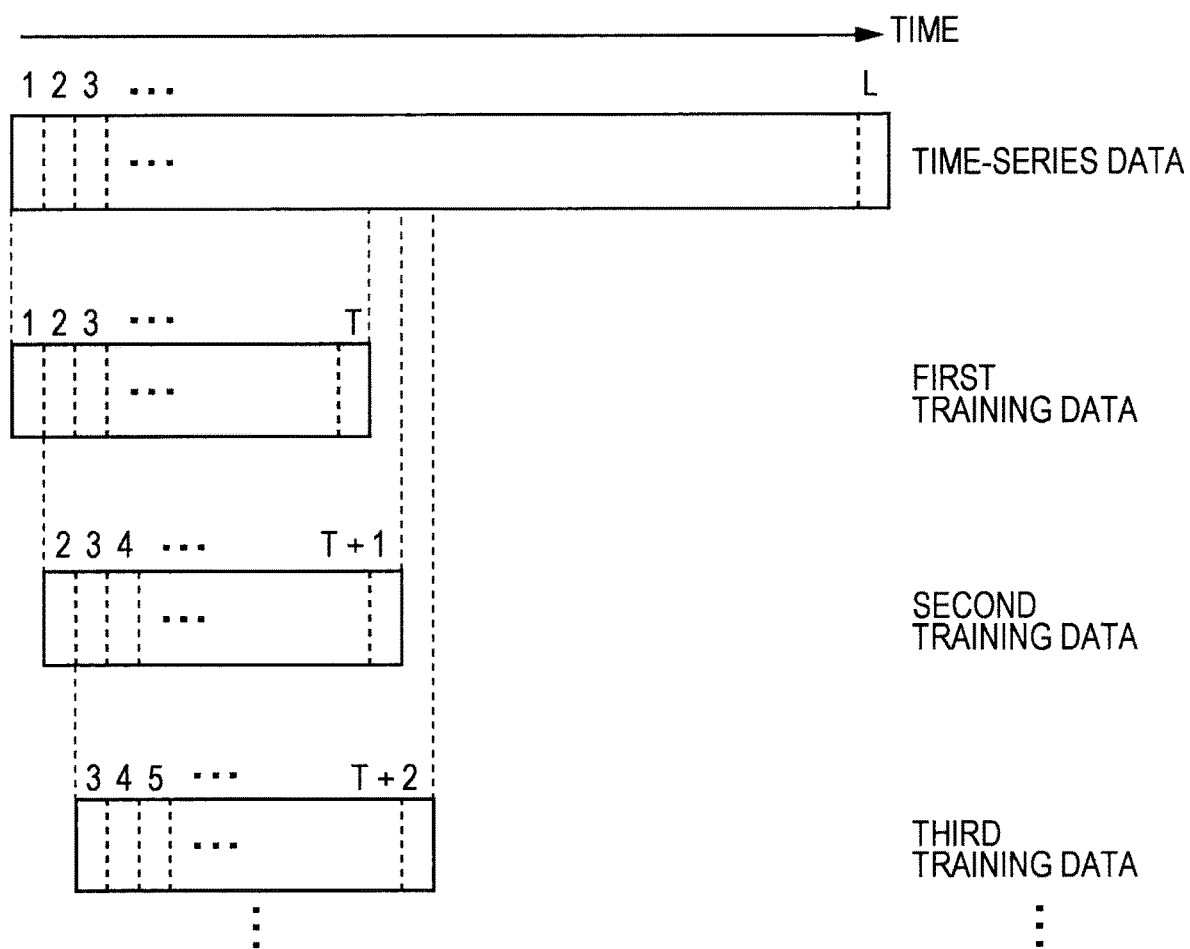
FIG. 4 illustrates an exemplary configuration of time-series data and training data for use in learning according to an embodiment.

FIG. 4 illustrates an example of structures of time-series data and training data for use in learning in the embodiment. In FIG. 4, the horizontal axis denotes time. FIG. 4 illustrates an example case where the learning apparatus 100 uses time-series data y[1, L] having a duration L that is longer than a duration T of time-series data y[1, T] used as training data by the learning apparatus 100 during learning.

The learning apparatus 100 first performs learning using, as first training data, a time-series data segment of the time-series data from a time point 1 to a time point T. Specifically, the learning apparatus 100 performs learning using data at a time point T as each input value xj[0] at the one time point and using the time-series data from the time point 1 to a time point T−1 as the input data sequence x(−T, −1] (i.e., a history).

Then, the learning apparatus 100 performs learning using, as second training data, a time-series data segment of the time-series data from a time point 2 to a time point T+1. The learning apparatus 100 may sequentially use each of D data items up to a time point T+D−1 as the input value xj[0] at the one time point. In this case, the learning apparatus 100 may use each of D time-series data segments from the time point D to the time point T+D−2 as the history by shifting the interval by one time point from the interval from the time point 1 to the time point T−1. The learning apparatus 100 may adjust the parameters D times for the D input values xj[0] and the corresponding D histories in this manner. That is, the learning apparatus 100 may use stochastic gradient descent in which the learning method described with (Eq. 8) to (Eq. 11) is performed for t ranging from 0 to D−1 by setting x[0] to y[T+t] and x(−T, −1] to y(t, T+t−1].

Alternatively, the learning apparatus 100 may acquire D time-series data sets, generate a plurality of training data sets from time-sequence data segments of a duration of L, and collectively perform learning for D layers. Specifically, the learning apparatus 100 may perform, collectively for D layers by using the following equation, stochastic gradient descent described using (Eq. 8) to (Eq. 11).

$$\theta \leftarrow \theta + \eta \sum_{x \in \{y^{(t,t+T-1]}\}|_{0 \leq t < D}} \nabla_\theta \log P_\theta(x^{[0]} | x^{(-\infty,-1]}) \qquad \text{Eq. 12}$$

Figure 5:
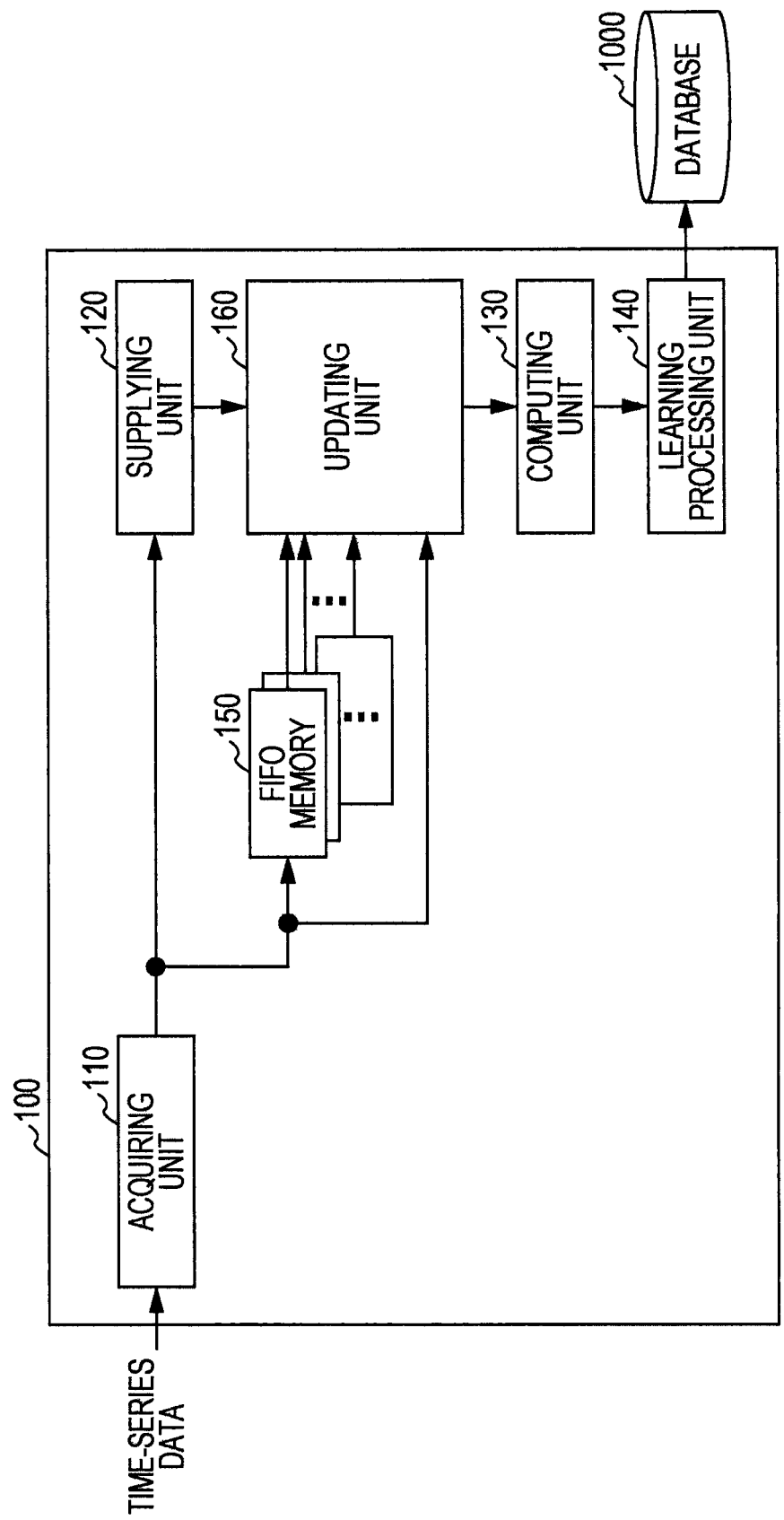
FIG. 5 illustrates a modification of a learning apparatus according to an embodiment.

FIG. 5 illustrates a modification of the learning apparatus 100 according to the embodiment. Components of the learning apparatus 100 illustrated in FIG. 5 that perform substantially the same operations as those of the learning apparatus 100 according to the embodiment illustrated in FIG. 1 are denoted by the same references, and a description thereof is omitted. In the case where time-series data of a duration L is given as described in FIG. 4, the learning apparatus 100 according to the modification efficiently updates parameters by using FIFO memories 150 and learns a model corresponding to the time-series input data. The learning apparatus 100 according to the modification further includes FIFO memories 150 and an updating unit 160. In this modification, the FIFO memories 150 omit the necessity of nodes of −1st layer to (−T+1)th layer that hold a history. In this modification, the case where T is an infinite number will be described.

Each of the FIFO memories 150 sequentially stores an input value of new input data of time-series input data and outputs the input value after a predetermined number of time points. Each of the FIFO memories 150 is a memory that first outputs data that has been stored first (FIFO: First In, First Out). The learning apparatus 100 includes a plurality of FIFO memories 150, the number of which is greater than or equal to the number of nodes n of the model. A plurality of FIFO memories 150 is desirably provided to have a one-to-one correspondence with the plurality of nodes. That is, each of the plurality of FIFO memories 150 is provided between a corresponding one of a plurality of input values of past input data in the time-series input data and a corresponding one of the plurality of nodes.

The plurality of FIFO memories 150 are connected to the acquiring unit 110 and sequentially store input values of new input data of time-series data. The plurality of FIFO memories 150 are also connected to the updating unit 160 and sequentially supplies the data stored therein to the updating unit 160.

The updating unit 160 updates a plurality of update parameters that are based on the input data sequence of the time-series input data before the one time point, from values for a prior time point to values for the one time point on the basis of values of the update parameters and input values of input data to be reflected next. The updating unit 160 updates the update parameters by using input values input to the FIFO memories 150 and input values output from the FIFO memories 150. The updating unit 160 may be connected to the acquiring unit 110 and may receive input values input to the FIFO memories 150. Alternatively, the updating unit 160 may receive input values input to the FIFO memories 150 from the acquiring unit 110 via the supplying unit 120.

Herein, the update parameters are $\alpha i, j, k$ and $\gamma i, l$ denoted by (Eq. 5) and (Eq. 7). That is, the update parameters are based on input values of input data of the input data sequence at each time point and the predefined parameters $\lambda_{kt1}$ and $\mu_{lt2}$ of the weight parameter $W_{ij}[\delta]$ between the input value and the corresponding target node i. The update parameters are updated every time the acquiring unit 110 acquires time-series input data. The above-described learning apparatus 100 according to the modification learns a modification of the model 10. The modification of the model 10 will be described with reference to FIG. 6.

Figure 6:
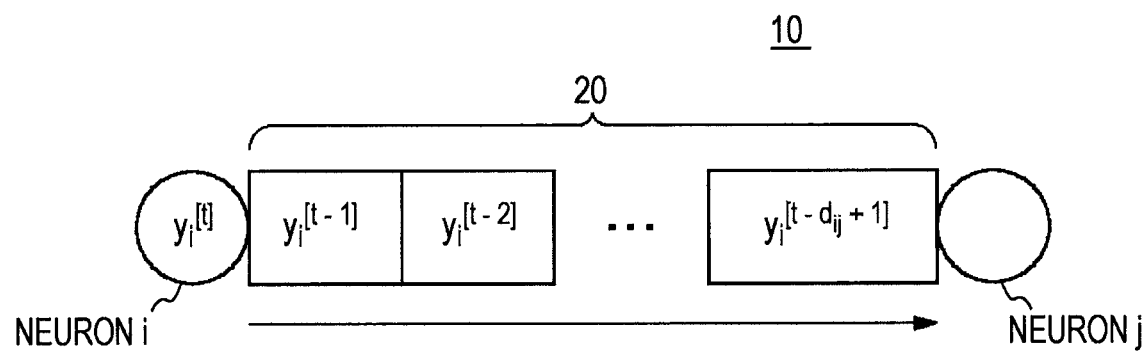
FIG. 6 illustrates a modification of a model according to an embodiment.

FIG. 6 illustrates a modification of the model 10 according to the embodiment. The model 10 according to the modification does not have a layered structure including T layers illustrated in FIG. 2. FIG. 6 illustrates an example of a model corresponding to one of the FIFO memories 150. Accordingly, the overall configuration of the model 10 according to the modification includes a storage area that stores training data and is equivalent to the 0th layer in FIG. 2 and as many configurations illustrated in FIG. 6 as the number of nodes n. Neurons i and j and an FIFO sequence 20 of the model 10 according to the modification will be described.

The neuron i is equivalent to the input terminal of the FIFO memory 150. An input value yi[t] of input data of the input data sequence at a corresponding node at each time point t is sequentially input to the neuron i. The neuron i sets the input value yi[t] as current input value. Then, at a time point t+1, the neuron i supplies the input value yi[t] input at the time point t to the updating unit 160 and to the FIFO sequence 20 as the previous input value and holds the input value yi[t+1] at the time point t+1 as the current input value.

The FIFO sequence 20 stores dij−1 latest input values received from the neuron i. The FIFO sequence 20 supplies the dij−1 input values stored therein to the updating unit 160. The updating unit 160 computes values of the update parameters denoted by (Eq. 6) by using the input values supplied by the FIFO sequence 20. In the case of the FIFO sequence 20 holds data from yi[t−1] to yi[t−dij+1], the FIFO sequence 20 is denoted by the following equation.

$$q_{i,j} \equiv (y_i^{[t-1]}, \ldots, y_i^{[t-dij+2]}, y_i^{[t-dij+1]}) \qquad \text{Eq. 13}$$

After the input value yi[t1] is input to the neuron i at the time point t1, the FIFO sequence 20 stores the input value yi[t1] up until a time point t3 (=t1+dij−1) which is after a predetermined time period dij−1 from the next time point t2 (=t1+1) of the time point t1. At the next time point t4 (=t3+1=t1+dij), the FIFO sequence 20 supplies the input value yi[t1] to the neuron j. The input value yi[t1] supplied to the neuron j at the time point t4 is immediately supplied to the updating unit 160 at the time point t4. However, the input value yi[t1] which the neuron j has received from the FIFO sequence 20 at the time point t4 does not serve as an input of the neuron j, and the input value yi[t4] is input to the neuron j at the time point t4.

The neuron j is equivalent to the output terminal of the FIFO memory 150. The neuron j receives the input value yi[t1] input to the neuron i at the time point t1, via the FIFO sequence 20 after the time period dij, that is, at the time point t1+dij. That is, the model 10 from the neuron i to the neuron j via the FIFO sequence 20 corresponds to the FIFO memory 150 that store dij input data items. In addition, the neuron i of the model 10 according to the modification corresponds to, for example, a node for an input data sequence such as a node i of the −δth layer of the model 10 illustrated in FIG. 2. The neuron j corresponds to, for example, the node j of the 0th layer. At the time point t1+dij, the neuron j supplies the received input value yi[t1] to the updating unit 160.

As described above, the model 10 according to the modification supplies the input values yi[t−1] and yi[t−dij] to the updating unit 160 at the time point t. Accordingly, the updating unit 160 can update the update parameters by adding the input value of the input data to be reflected next to the update parameters for the prior time point of the one time point and then multiplying the resulting sum by a predetermined constant. Note that the update parameters denoted by (Eq. 8) are computed in accordance with (Eq. 8) by using the input values stored in the FIFO sequence 20 that are supplied to the updating unit 160.

For example, the update parameter γi,l denoted by (Eq. 7) can be updated by using the input values supplied to the updating unit 160 and the second predefined parameter Specifically, the updating unit 160 can compute the update parameter γi,l to be used in current learning by performing computing at the time point t according to the following equation by using the prior update parameter γi,l and the input value yi[t−1] received from the neuron i at the time point t.

$$\gamma_{i,l} \leftarrow \mu_l(\gamma_{i,l} + y_i^{[t-1]}) \qquad \text{Eq. 14}$$

Figure 7:
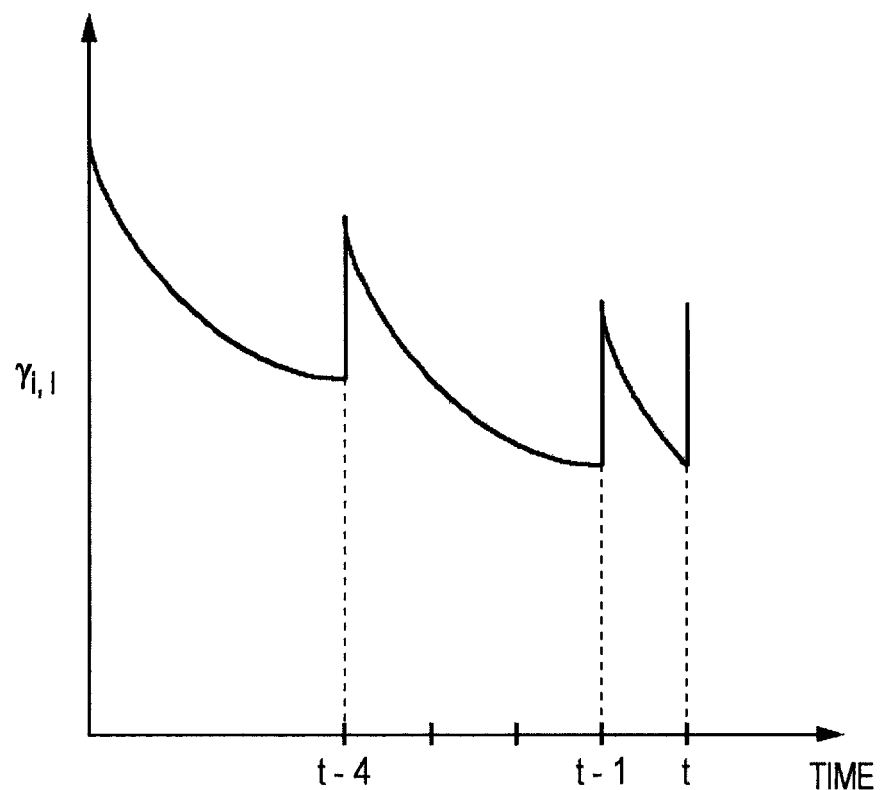
FIG. 7 illustrates an example of a temporal change in an update parameter $\gamma_{i,l}$ according to an embodiment.

FIG. 7 illustrates an example of a temporal change in the update parameter γi,l according to the embodiment. FIG. 7 illustrates an example in which values greater than 0 (for example, 1) are input to the neuron i as the input value at time points t−5, t−2, and t−1 and these input values are supplied to the updating unit 160 at time points t−4, t−1, and t. The second predefined parameter μl is a parameter whose value gradually decreases as the time difference increases. Accordingly, the update parameter γi,l computed by the updating unit 160 tends to decrease as time passes from when the input value of 1 is input to when the next input is given.

The update parameter αi, j, k denoted by (Eq. 5) can be updated by using the input values supplied to the updating unit 160 and the first predefined parameter λk. Specifically, the updating unit 160 can compute the updating parameter αi, j, k to be used in current learning by performing computing at the time point t according to the following equation by using the prior update parameter αi, j, k and the input value yi[t−dij] received from the neuron j at the time point t.

$$\alpha_{i,j,k} \leftarrow \lambda_k(\alpha_{i,j,k} + y_i^{[t-dij]}) \qquad \text{Eq. 15}$$

Figure 8:
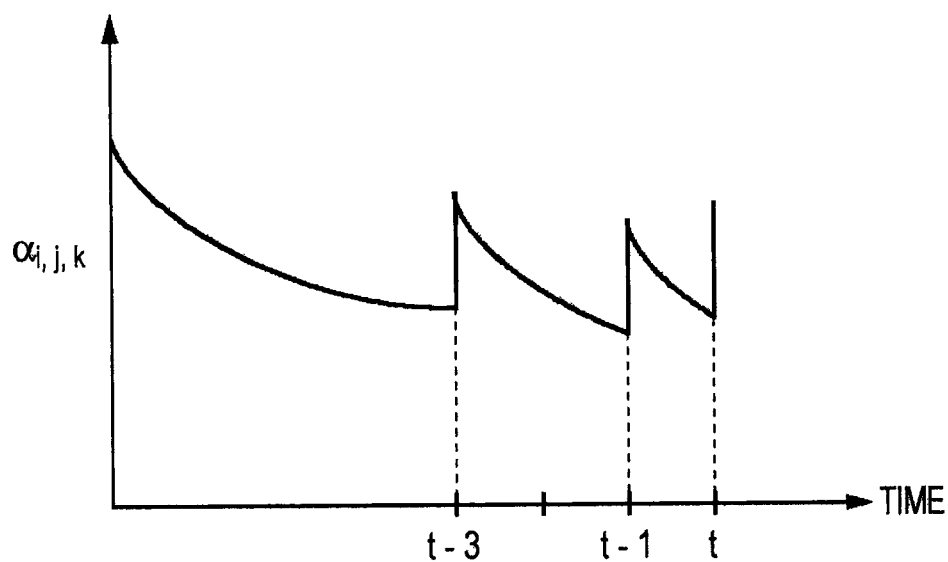
FIG. 8 illustrates an example of a temporal change in an update parameter $\alpha_{i,j,k}$ according to an embodiment.

FIG. 8 illustrates an example of a temporal change in the update parameter αi, j, k according to the embodiment. FIG. 8 illustrates an example in which values greater than 0 (for example, 1) are supplied to the neuron j as the input value at time points t−3, t−1, and t. The first predefined parameter λk is a parameter whose value gradually decreases as the time difference increases. Accordingly, the update parameter αi, j, k computed by the updating unit 160 tends to decrease as time passes from when the input value of 1 is input to when the next input is given.

As described above, the learning apparatus 100 according to the modification can update the update parameters αi, j, k and γi,l by applying the model 10 illustrated in FIG. 6 using the FIFO memories 150 and the updating unit 160. Note that the updating unit 160 can apply the model 10 according to the modification, for example, by acquiring the input values xi[t−1] at the time point t−1 from the input data input to the FIFO memories 150 and acquiring the input values xi[t−dij] at the time point t−dij from the output of the FIFO memories 150.

In addition, the learning apparatus 100 may update the parameter βi, j, l through substantially the same operation as the operation described in FIG. 3. Specifically, the computing unit 130 computes the parameter βi, j, l by determining the sum of products of the second predefined parameter μl and the input value xi (yi in this modification) for time points from t−1 to t−dij+1 as indicated by (Eq. 6).

In this way, the computing unit 130 according to the modification can compute, by using the plurality of update parameters, conditional probabilities of input data values at one time point given that the input data sequence has occurred. Then, the learning processing unit 140 can decide upon the learning parameters ui, j, k and vi, j, l and the bias parameter bj by performing substantially the same operation as the operation described in FIG. 3.

As described above, the learning apparatus 100 according to the modification illustrated in FIG. 5 can update the updating parameters αi, j, k and γi,l more easily than the learning apparatus 100 illustrated in FIG. 1 and can learn the model 10 according to the modification with the reduced storage capacity and computing cost. In addition, the model 10 according to the modification can be readily associated with the FIFO memories 150 and thus can be readily implemented as hardware, which leads to increased design efficiency. For example, when the model 10 is implemented as hardware, the updating unit 160 can be distributed to individual neurons. In this case, the updating unit 160 in the neuron i can update the update parameters related to the neuron i by using the input values input or supplied to the neuron i.

Figure 9:
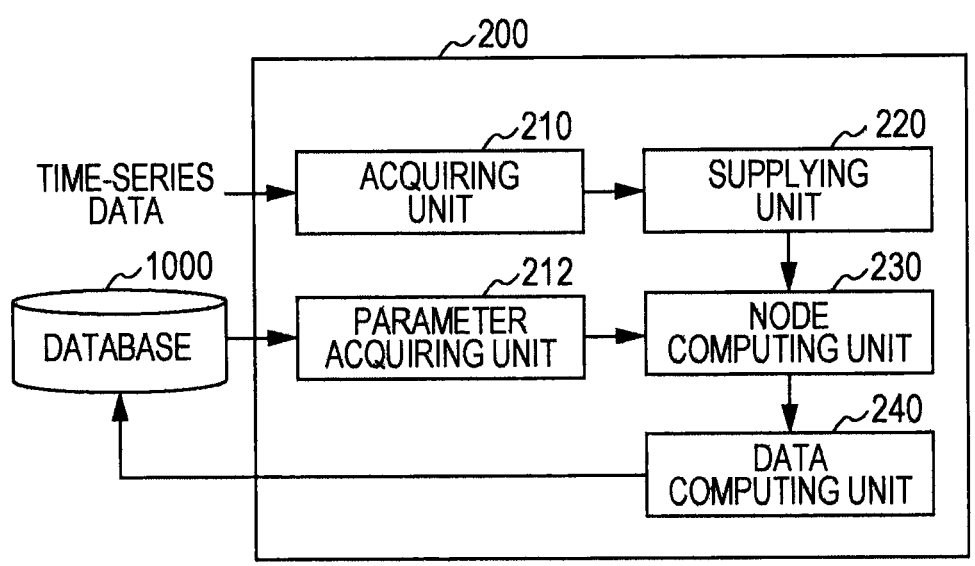
FIG. 9 illustrates an exemplary configuration of a processing apparatus according to an embodiment.

FIG. 9 illustrates an example of a configuration of a processing apparatus 200 according to the embodiment. The processing apparatus 200 predicts next data from time-series input data by using a model based on time-series data. The processing apparatus 200 includes an acquiring unit 210, a parameter acquiring unit 212, a supplying unit 220, a node computing unit 230, and a data computing unit 240.

The acquiring unit 210 acquires time-series input data. The acquiring unit 210 may be connected to, for example, a device operated by a user and may acquire time-series input data from the device. In addition, the acquiring unit 210 may read out and acquire time-series input data stored in a storage device or the like in a predetermined format. In addition, the acquiring unit 210 may be connected to a network or the like and may acquire time-series input data via the network. In addition, the acquiring unit 210 may store the acquired time-series input data in a storage device or the like included in the processing apparatus 200.

The parameter acquiring unit 212 acquires parameters that have been decided in advance through learning. The parameter acquiring unit 212 may be connected to an external storage device or the like and may acquire the learning parameters ui, j, k and vi, j, l and the bias parameter bj that have been decided by the above-described learning apparatus 100 through learning. In addition, the parameter acquiring unit 212 may be connected to the learning apparatus 100 or the like. In this case, the parameter acquiring unit 212 is connected to, for example, the learning processing unit 140.

The supplying unit 220 supplies a plurality of input values corresponding to a target time point to a plurality of nodes of a model. The supplying unit 220 is connected to the acquiring unit 210 and supplies an input data sequence of the received time-series input data at a time point prior to the prediction target time point to the corresponding nodes of the model.

The node computing unit 230 computes a conditional probability of a value at each node at the prediction target time point given that the input data sequence has occurred, on the basis of the input data sequence of the time-series input data at the time point prior to the prediction target time point and a weight parameter between each of the plurality of input values of the input data of the input data sequence and a corresponding one of the plurality of nodes of the model. Specifically, the node computing unit 230 is connected to the parameter acquiring unit 212 and computes a conditional probability of a value at each node of the 0th layer on the basis of the learning parameter ui, j, k and vi, j, l and the bias parameter bj that have been received. The node computing unit 230 supplies the resulting conditional probabilities to the data computing unit 240.

The data computing unit 240 computes a conditional probability of a vector value of the 0th layer on the basis of the conditional probabilities of the values at the respective nodes of the 0th layer. The data computing unit 240 is connected to the node computing unit 230 and computes a conditional probability of the next data being, for example, 1 or 0 on the basis of the received conditional probabilities. The data computing unit 240 stores the resulting conditional probability in an external storage device such as the database 1000. Alternatively, the data computing unit 240 may store the resulting conditional probability in a storage device included in the processing apparatus 200.

The above-described processing apparatus 200 according to the embodiment acquires, for example, an input data sequence from a time point −1 to a time point −T+1 as time-series input data and predicts data at a time point 0. A prediction operation of the processing apparatus 200 will be described with reference to FIG. 10.

Figure 10:
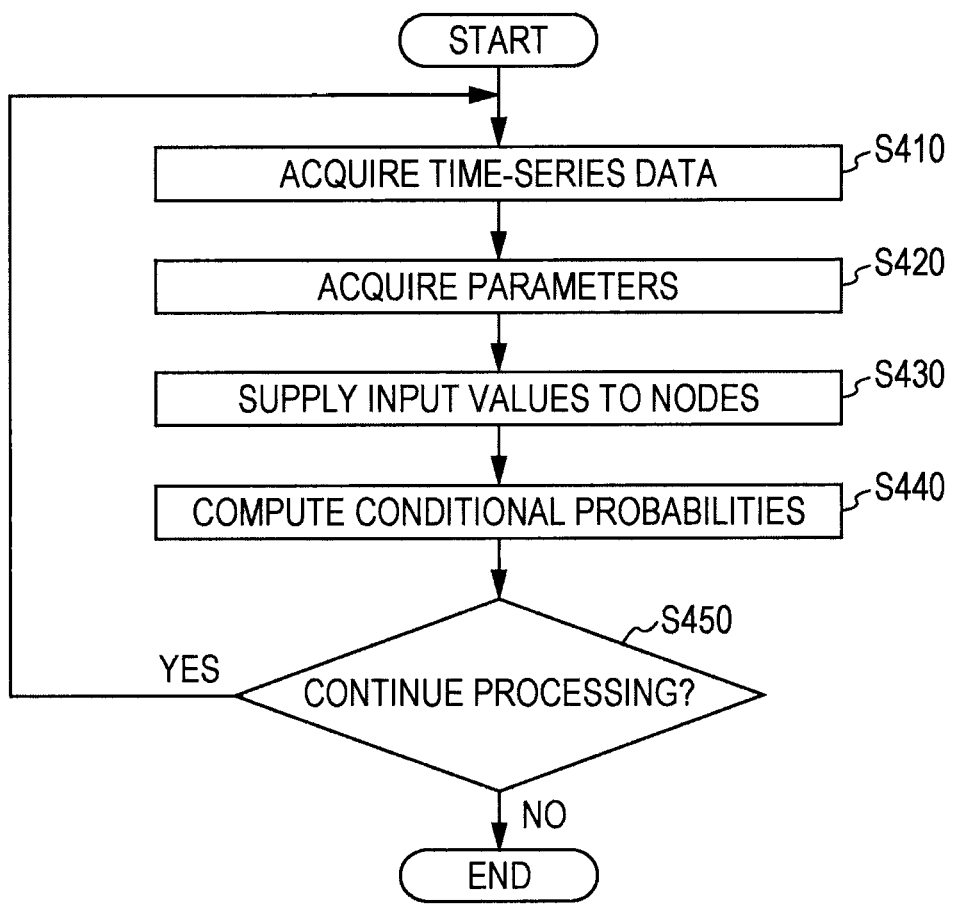
FIG. 10 illustrates a flow of an operation of the processing apparatus according to an embodiment.

FIG. 10 illustrates a flow of an operation of the processing apparatus 200 according to the embodiment. In the embodiment, the processing apparatus 200 performs processing steps S410 to S450 so as to predict values of the next data given that time-series input data has occurred. An example will be described in which the processing apparatus 200 predicts values of data by using the model 10 illustrated in FIG. 2.

First, the acquiring unit 210 acquires time-series input data (S410). The acquiring unit 210 may acquire time-series input data having a duration equivalent to a total of T−1 layers from the −1st layer to the (−T+1)th layer of the model 10. For example, the acquiring unit 210 acquires T−1 time-series image data items of moving image data.

Then, the parameter acquiring unit 212 acquires parameters that have been decided in advance through learning (S420). The parameter acquiring unit 212 supplies the acquired parameters to the node computing unit 230.

Then, the supplying unit 220 supplies input values of an input data sequence to corresponding nodes of a total of T−1 layers from the −1st layer to the (−T+1)th layer of the model 10 (S430).

Then, the node computing unit 230 and the data computing unit 240 compute conditional probabilities for the 0th layer (S440). The node computing unit 230 computes the weight parameter Wi,j[δ] by substituting the learning parameters ui, j, k and vi, j, l received from the parameter acquiring unit 212 into (Eq. 1). Then, the node computing unit 230 computes a conditional probability Pθ,j(xj[0]|x(−∞,−1]) of a value at each node j of the 0th layer given that the input data sequence has occurred, by using the received bias parameter bj, the computed weight parameter Wi,j[δ], and (Eq. 2) and (Eq. 3).

The data computing unit 240 then substitutes the conditional probabilities Pθ,j(xj[0]|x(−∞,−1]) obtained according to (Eq. 3) into the following equation, and computes a conditional probability Pθ(x[0]|x(−∞,−1]) of a vector value of the 0th layer given that the time-series input data has occurred.

$$P_\theta(x^{[0]} \mid x^{(-\infty,-1]}) = \prod_{j \in [1,N]} P_{\theta,j}(x_j^{[0]} \mid x^{(-\infty,-1]}) \equiv \prod_{j \in [1,N]} \frac{\exp(-\tau^{-1} E_{\theta,j}(x_j^{[0]} \mid x^{(-\infty,-1]}))}{\sum_{x_j^{[0]} \in \{0,1\}} \exp(-\tau^{-1} E_{\theta,j}(x_j^{[0]} \mid x^{(-\infty,-1]}))} \quad \text{Eq. 16}$$

The data computing unit 240 computes, as the conditional probability Pθ(x[0]|x(−∞,−1]) of a vector value of the 0th layer given that the time-series input data has occurred, a product of the conditional probabilities Pθ,j(xj[0]|x(−∞,−1]) of the values of the individual nodes j of the 0th layer being a value corresponding to the predetermined value at the prediction target time point given that the time-series input data has occurred. In this way, the data computing unit 240 can predict the data values of the 0th layer. For example, the processing apparatus 200 can generate a moving image including a total of T images by predicting one image data item at the next time point on the basis of T−1 time-series image data items.

Then, the processing apparatus 200 determines whether to continue the prediction process (S450). The processing apparatus 200 may continue the prediction process a predetermined number of times or may continue the prediction process until a stop command is input by the user.

If the processing apparatus 200 continues the prediction (S450: YES), the process returns to block S410 in which time-series data is acquired. In this case, the acquiring unit 210 acquires the previous prediction result as new time-series data, and uses the time-series data of the 0th layer to the (−T+2)th layer of the previous prediction as time-series data of the −1st layer to the (−T+1)th layer of this prediction. Then, the processing apparatus 200 predicts data values of the 0th layer. In this way, the processing apparatus 200 predicts data values at the next time point on the basis of the prediction result and sequentially predicts time-series data at feature time points. If the processing apparatus 200 terminates the prediction process (S450: NO), the data computing unit 240 stores the prediction result in the external database 1000 or the like and terminates the process.

For example, the processing apparatus 200 can generate a moving image including a total of T+M−1 images corresponding to the number of times of prediction M by sequentially predicting the next image data item on the basis of T−1 time-series image data items. In this way, feature moving image data can be predicted on the basis of past moving image data. In this case, comparison of the moving image data at feature time points with moving images actually obtained by capturing images enables detection of abnormal images which are difficult to predict.

As described above, the processing apparatus 200 according to the embodiment can compute a conditional probability of input data at one time point on the basis of the input data sequence x(−∞, −1] which is the history and the learning result obtained by the learning apparatus 100 by using a time evolution model such as the model 10 illustrated in FIG. 2. Because the processing apparatus 200 can predict time-sequence data at the next time point on the basis of the result of learning the time evolution model 10, the use of the processing apparatus 200 along with the learning apparatus 100 allows the time evolution model to be applied to time-series prediction or the like.

The learning apparatus 100 and the processing apparatus 200 according to the embodiment described above can perform processes at individual nodes of the 0th layer of the model 10 illustrated in FIG. 2 independently of one another. Accordingly, in the case where the learning apparatus 100 and the processing apparatus 200 are implemented by hardware and/or software, they can be implemented independently of each other. This allows learning and prediction to be performed efficiently at high speed through processing such as distributed processing and parallel processing.

In the embodiment, the example has been described in which the learning apparatus 100 and the processing apparatus 200 are separate apparatuses that function independently. Alternatively, the learning apparatus 100 and the processing apparatus 200 may be included in one apparatus. For example, a prediction system including the learning apparatus 100 and the processing apparatus 200 may be constructed. In this case, the parameter acquiring unit 212 of the processing apparatus 200 may be connected to the learning processing unit 140 of the learning apparatus 100 and may acquire parameters which the learning processing unit 140 has decided upon through learning.

Figure 11:
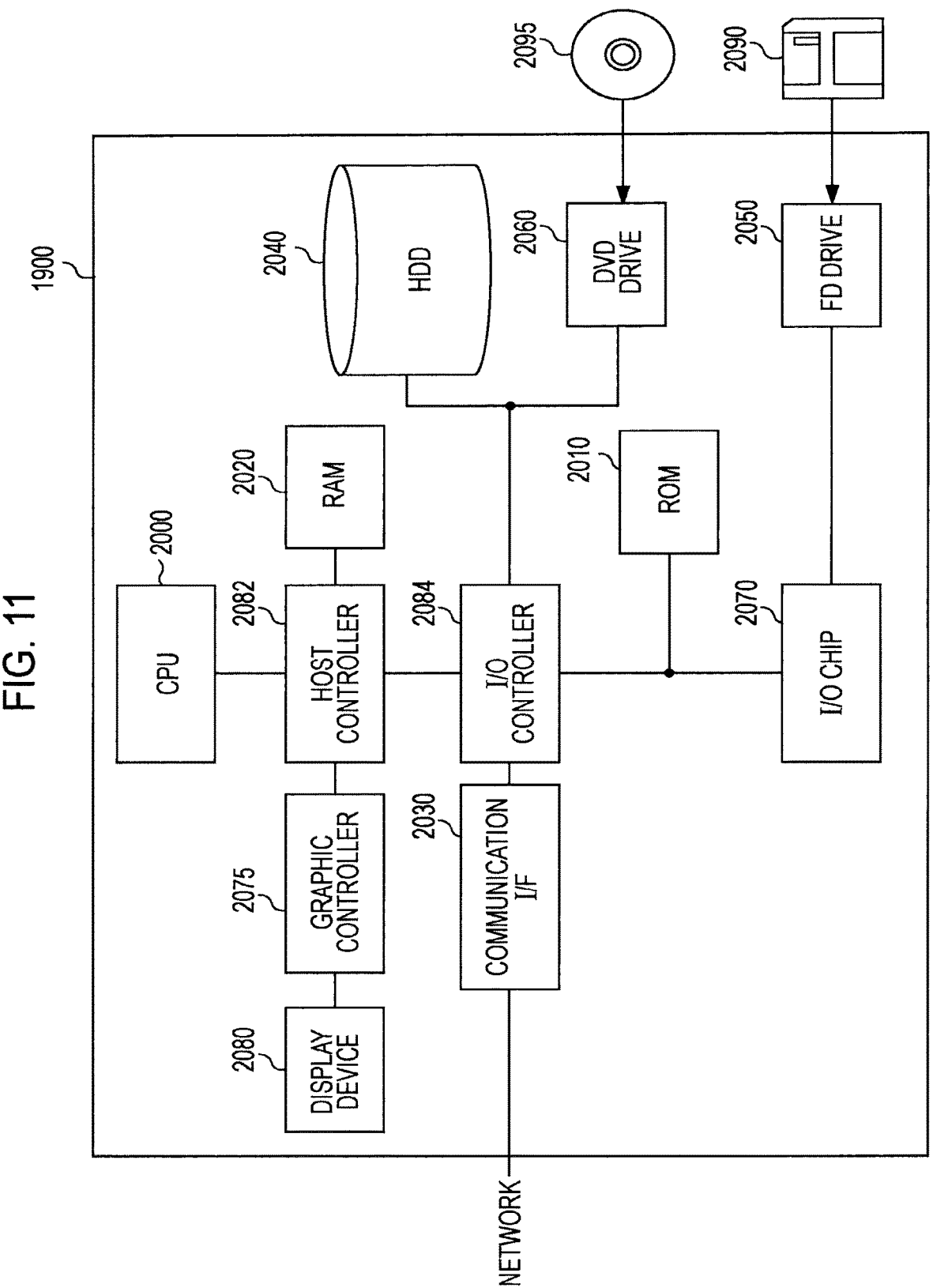
FIG. 11 illustrates an example of a hardware configuration of a computer according to an embodiment.

FIG. 11 illustrates an example of a hardware configuration of a computer 1900 that functions as the learning apparatus 100 and the processing apparatus 200 according to the embodiment. The computer 1900 according to the embodiment includes a central processing unit (CPU) peripheral section, an input/output (I/O) section, and a legacy I/O section. The CPU peripheral section includes a CPU 2000, a random access memory (RAM) 2020, a graphic controller 2075, and a display device 2080, which are connected to each other via a host controller 2082. The I/O section includes a communication interface (I/F) 2030, a hard disk drive (HDD) 2040, and a digital versatile disc (DVD) drive 2060, which are connected to the host controller 2082 via an I/O controller 2084. The legacy I/O section includes a ROM 2010, a flexible disk (FD) drive 2050, and an I/O chip 2070, which are connected to the I/O controller 2084.

The host controller 2082 connects the RAM 2020 to the CPU 2000 and the graphic controller 2075 that access the RAM 2020 at high transfer rates. The CPU 2000 operates based on programs stored in the ROM 2010 and the RAM 2020 to control each component. The graphic controller 2075 acquires image data generated by the CPU 2000 or the like in a frame buffer provided in the RAM 2020, and displays an image of the image data on the display device 2080. Alternatively, the graphic controller 2075 may include a frame buffer that stores image data generated by the CPU 2000 or the like therein.

The I/O controller 2084 connects the host controller 2082 to the communication interface 2030, the hard disk drive 2040, and the DVD drive 2060, which are relatively high-speed I/O devices. The communication interface 2030 communicates with another apparatus via a network. The hard disk drive 2040 stores programs and data used by the CPU 2000 within the computer 1900. The DVD drive 2060 reads programs or data from a DVD-ROM 2095 and supplies the programs or the data to the hard disk drive 2040 via the RAM 2020.

The I/O controller 2084 is also connected to the ROM 2010, the flexible disk drive 2050, and the I/O chip 2070, which are relatively low-speed I/O devices. The ROM 2010 stores a boot program executed at the time of booting of the computer 1900 and/or programs that are dependent on hardware of the computer 1900. The flexible disk drive 2050 reads programs or data from a flexible disk 2090 and supplies the programs or the data to the hard disk drive 2040 via the RAM 2020. The I/O chip 2070 connects the flexible disk drive 2050 to the I/O controller 2084 and also connects various I/O devices to the I/O controller 2084 via, for example, a parallel port, a serial port, a keyboard port, a mouse port, and so forth.

The programs are supplied to the hard disk drive 2040 via the RAM 2020 by the user with being stored on a recording medium, such as the flexible disk 2090, the DVD-ROM 2095, or an IC card. The programs are read out from the recording medium, are installed into the hard disk drive 2040 in the computer 1900 via the RAM 2020, and are executed by the CPU 2000.

The programs are installed into the computer 1900 and causes the computer 1900 to function as the acquiring unit 110, the supplying unit 120, the computing unit 130, the learning processing unit 140, the FIFO memories 150, the updating unit 160, the acquiring unit 210, the parameter acquiring unit 212, the supplying unit 220, the node computing unit 230, and the data computing unit 240.

Information processing written in these programs is loaded to the computer 1900, thereby functioning as the acquiring unit 110, the supplying unit 120, the computing unit 130, the learning processing unit 140, the FIFO memories 150, the updating unit 160, the acquiring unit 210, the parameter acquiring unit 212, the supplying unit 220, the node computing unit 230, and the data computing unit 240, which are specific means resulting from cooperation of software and the aforementioned various hardware resources. These specific means implement computing or processing of information according to the usage of the computer 1900 in the embodiment, thereby constituting the unique learning apparatus 100 and processing apparatus 200 according to the usage.

For example, when the computer 1900 communicates with an external apparatus or the like, the CPU 2000 executes a communication program that has been loaded to the RAM 2020 and instructs the communication interface 2030 to perform communication processing on the basis of processing content written in the communication program. Under control of the CPU 2000, the communication interface 2030 reads out transmission data stored in a transmission buffer or the like provided in a storage device, such as the RAM 2020, the hard disk drive 2040, the flexible disk 2090, or the DVD-ROM 2095, and transmits the transmission data to the network; or the communication interface 2030 writes reception data received from the network in a reception buffer or the like provided in the storage device. In this way, the communication interface 2030 may transfer transmission/reception data from and to the storage device by using the direct memory access (DMA) method. Alternatively, the CPU 2000 reads out data from a storage device or the communication interface 2030 serving as a transfer source, and writes the data in the communication interface 2030 or the storage device serving as a transfer destination, whereby transmission/reception data may be transferred.

Moreover, the CPU 2000 loads the entirety or necessary part of a file or a database stored in an external storage device, such as the hard disk drive 2040, the DVD drive 2060 (DVD-ROM 2095), or the flexible disk drive 2050 (flexible disk 2090), into the RAM 2020 by using the DMA transfer or the like. Then, the CPU 2000 performs various types of processing on the data in the RAM 2020. Then, the CPU 2000 writes the processed data back to the external storage device using the DMA transfer or the like. In such processing, because the RAM 2020 can be considered as a device that temporarily stores the content of the external storage device, the RAM 2020, the external storage device, and the like are collectively referred to as a memory, a storage unit, or a storage device in the embodiment. Various types of information, such as various programs, data, tables, and a database in the embodiment are stored in such a storage device and subjected to information processing. The CPU 2000 may store a part of data of the RAM 2020 in a cache memory and may perform read and write operations on the cache memory. Even in such an embodiment, since the cache memory undertakes some of the functions of the RAM 2020, it is assumed in the embodiment that the cache memory is included in the RAM 2020, a memory, and/or a storage device, unless otherwise noted.

Moreover, the CPU 2000 performs, on data read out from the RAM 2020, various types of processing specified by an instruction sequence in a program. The various types of processing include various types of computing, processing of information, condition determination, and retrieval and replacement of information described in the embodiment. Then, the CPU 2000 writes the processed data back to the RAM 2020. For example, when the CPU 2000 performs condition determination, the CPU 2000 compares each of the various types of variables described in the embodiment with another variable or a constant and determines whether a condition is satisfied. Examples of the condition include the variable is greater than the other variable or the constant, the variable is less than the other variable or the constant, the variable is greater than or equal to the other variable or the constant, the variable is less than or equal to the other variable or the constant, and the variable is equal to the other variable or the constant. When the condition is satisfied (or is not satisfied), the process branches to a different instruction sequence, or a subroutine is called.

Additionally, the CPU 2000 can search for information stored in files or databases stored in storage devices. For example, when a plurality of entries, in each of which an attribute value of a second attribute is associated with an attribute value of a first attribute, are stored in a storage device, the CPU 2000 searches for an entry whose attribute value of the first attribute satisfies a specified condition from among the plurality of entries stored in the storage device and reads out the attribute value of the second attribute stored in the entry, thereby being able to acquire the attribute value of the second attribute associated with the first attribute satisfying the predetermined condition.

The above-described programs or modules may be stored on an external recording medium. In addition to the flexible disk 2090 and the DVD-ROM 2095, for example, an optical recording medium such as a DVD, a Blu-ray disc (registered trademark) or a CD, a magneto-optical recording medium such as an MO, a tape medium, or a semiconductor memory such as an IC card may be used as the recording medium. Moreover, a storage device, such as a hard disk or a RAM, provided in a server system connected to a private communication network or the Internet may be used as the recording medium, and the programs may be supplied to the computer 1900 via the network.

While the present invention has been described using the embodiment, the technical scope of the present invention is not limited to the scope of the description of the aforementioned embodiment. It is obvious to persons skilled in the art that various changes or improvements can be made in the aforementioned embodiment. It is obvious from the description of the claims that such changes or improvements are also included in the technical scope of the present invention.

It should be noted that, regarding the execution order of processes such as operations, procedures, steps, and stages in devices, systems, programs, and methods described in the claims, the description, and the drawings, expressions such as "before" and "prior to" are not explicitly given, and the devices, the systems, the programs, and the methods can be implemented in any order unless the output of a preceding process is used by a following process. Even when operation flows in the claims, the description, and the drawings are described using expressions such as "first" and "next" for convenience, this does not mean that such order is required.

REFERENCE SIGNS LIST 10 model, 20 FIFO sequence, 100 learning apparatus, 110 acquiring unit, 120 supplying unit, 130 computing unit, 140 learning processing unit, 150 FIFO memory, 160 updating unit, 200 processing apparatus, 210 acquiring unit, 212 parameter acquiring unit, 220 supplying unit, 230 node computing unit, 240 data computing unit, 1000 database, 1900 computer, 2000 CPU, 2010 ROM, 2020 RAM, 2030 communication interface, 2040 HDD, 2050 FD drive, 2060 DVD drive, 2070 I/O chip, 2075 graphic controller, 2080 display device, 2082 host controller, 2084 I/O controller, 2090 FD, 2095 DVD-ROM The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A learning apparatus for learning a model corresponding to time-series input data, comprising:
    a processor coupled to a memory, the processor configured to:
        acquire the time-series input data, wherein the time series input data is moving image data, and
        partitioning the time-series input data into a plurality of sets of input data, wherein each set of the plurality of sets of input data corresponds to a time point in a plurality of time points;
        populate the model with the time-series input data, wherein the model comprises a plurality of layers, wherein each layer in the plurality of layers corresponds to the time point in the plurality of time points, and wherein each layer comprises a plurality of nodes;
    wherein each node of the plurality of nodes in each of the plurality of layers is populated with a value from the time series input data;
    compute a conditional probability of an occurrence of an input data sequence for each of the values at a first time point in the plurality of time points;
        wherein the computing the conditional probability is based on the populated values in nodes of at least one layer in the plurality of layers corresponding to a second time point, wherein the second time point is prior to the first time point;
        wherein the computing the conditional probability is based on a weight parameter between each of the plurality of layers in the model;
    adjust the weight parameter so as to increase the conditional probability of occurrence of the input data sequence for each of the plurality of values at the first time point; and
    predict a next occurrence of the input data sequence for each of the plurality of values at a next time point; and
    wherein the weight parameter is based on a positive value and a negative value;
    wherein the positive value comprises a product of a first learning parameter and a first predefined parameter; and
    wherein the negative value comprises a product of a second learning parameter and a second predefined parameter;
    wherein the product of the first learning parameter and the first predefined parameter is taken when a time difference is greater than or equal to a predetermined delay constant; and
    wherein the product of the second learning parameter and the second predefined parameter is taken when the time difference is less than the predetermined delay constant and is not equal to 0.

2. The learning apparatus according to claim 1, wherein the first predefined parameter takes a first value obtained by raising a first constant to the power of a second value obtained by subtracting the predetermined delay constant from the time difference, the first constant being greater than 0 and less than 1, and
    the second predefined parameter takes a third value obtained by raising a second constant to the power of a negative value of the time difference, the second constant being greater than 0 and less than 1.

3. The learning apparatus according to claim 1, further comprising
    a FIFO memory that sequentially store a corresponding input value of new input data of the time-series input data and outputs the input value of new input data of the time-series input data after a predetermined number of time points; and wherein the processor is further configured to update the plurality of update parameters by using the outputs from the FIFO memory.

4. The learning apparatus according to claim 1, wherein the processor is further configured to: adjust the weight parameter collectively for a plurality of time points in response to acquisition of new input data at the plurality of time points.

5. The learning apparatus according to claim 1, wherein the processor is further configured to adjust a bias parameter given to each of the plurality of nodes of the model.

6. A computer program product for predicting next input data from time-series input data by using a model corresponding to the time-series input data, the computer program product comprising a computer readable storage medium having program instructions embodied therewith, wherein the computer readable storage medium is not a transitory signal per se, the program instructions executable by a processing circuit to cause the processing circuit to perform a method comprising:
    acquiring the time-series input data, wherein the time series input data is moving image data, and
    partitioning the time-series input data into a plurality of sets of input data, wherein each set of the plurality of sets of input data corresponds to a time point in a plurality of time points;
    populating the model with the time-series input data, wherein the model comprises a plurality of layers, wherein each layer in the plurality of layers corresponds to the time point in the plurality of time points, and wherein each layer comprises a plurality of nodes;
    wherein each node of the plurality of nodes in each of the plurality of layers is populated with a value from the time series input data;
        computing a conditional probability of an occurrence of an input data sequence for each of the values at a first time point in the plurality of time points;
            wherein the computing the conditional probability is based on the populated values in nodes of at least one layer in the plurality of layers corresponding to a second time point, wherein the second time point is prior to the first time point;
            wherein the computing the conditional probability is based on a weight parameter between each of the plurality of layers in the model;
        adjusting the weight parameter so as to increase the conditional probability of the occurrence of the input data sequence for each of the plurality of values at the first time point; and predicting a next occurrence of the input data sequence for each of the plurality of values at a next time point; and wherein the weight parameter is based on a positive value and a negative value;

wherein the positive value comprises a product of a first learning parameter and a first predefined parameter; and wherein the negative value comprises a product of a second learning parameter and a second predefined parameter;

wherein the product of the first learning parameter and the first predefined parameter is taken when a time difference is greater than or equal to a predetermined delay constant; and wherein the product of the second learning parameter and the second predefined parameter is taken when the time difference is less than the predetermined delay constant and is not equal to 0.

* * * * *